(12) United States Patent
Xie

(10) Patent No.: US 11,410,146 B2
(45) Date of Patent: Aug. 9, 2022

(54) ORDER PROCESSING

(71) Applicant: BEIJING SANKUAI ONLINE TECHNOLOGY CO., LTD, Beijing (CN)

(72) Inventor: Xiaojing Xie, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/044,263

(22) PCT Filed: Dec. 14, 2018

(86) PCT No.: PCT/CN2018/121315
§ 371 (c)(1),
(2) Date: Sep. 30, 2020

(87) PCT Pub. No.: WO2019/184460
PCT Pub. Date: Oct. 3, 2019

(65) Prior Publication Data
US 2021/0058341 A1 Feb. 25, 2021

(30) Foreign Application Priority Data
Mar. 30, 2018 (CN) .......................... 201810276941.6

(51) Int. Cl.
*G06Q 20/14* (2012.01)
(52) U.S. Cl.
CPC .................................. *G06Q 20/145* (2013.01)
(58) Field of Classification Search
CPC . G06Q 20/00–20; G06Q 20/327–3278; G06Q 20/14–145; G06Q 20/18; H04L 12/1453–1467
See application file for complete search history.

(56) References Cited

U.S. PATENT DOCUMENTS

2004/0077332 A1* 4/2004 Ephraim ............... H04M 15/55
455/405
2005/0027626 A1 2/2005 Garcia
(Continued)

FOREIGN PATENT DOCUMENTS

CN 101567070 A 10/2009
CN 103186852 A 7/2013
(Continued)

OTHER PUBLICATIONS

Mar. 18, 2019; International Search Report of the International Searching Authority for State Intellectual Property Office of the People's Republic of China in PCT application No. PCT/CN2018/121315, , which is an international application corresponding to this U.S. application.

(Continued)

*Primary Examiner* — Brendan Y Higa

(74) *Attorney, Agent, or Firm* — Kolitch Romano LLP

(57) ABSTRACT

An order processing system is provided, including a first client (100), a second client (110), an order server (120), a resource manager (130), and a resource transfer server (140). The order server communicates with the resource transfer server through the resource manager according to a received order preprocessing request to complete transfer of a prepaid resource. Then the order server performs order settlement according to a received order settlement request or order cancellation request.

19 Claims, 8 Drawing Sheets

(56) References Cited

U.S. PATENT DOCUMENTS

| | | | |
|---|---|---|---|
| 2006/0207856 A1* | 9/2006 | Dean | G07F 17/26 194/302 |
| 2007/0198432 A1* | 8/2007 | Pitroda | G06Q 20/42 705/64 |
| 2008/0233917 A1* | 9/2008 | Liu | H04L 12/14 455/406 |
| 2012/0271660 A1* | 10/2012 | Harris | G06Q 20/12 705/4 |
| 2013/0297498 A1* | 11/2013 | Nazaret | H04L 67/2804 705/40 |
| 2014/0358707 A1 | 12/2014 | Perkins | |
| 2014/0379442 A1* | 12/2014 | Dutta | G06Q 20/3278 705/13 |
| 2016/0005016 A1* | 1/2016 | Eliahu | G06Q 20/28 705/44 |
| 2017/0046632 A1 | 2/2017 | Fabris et al. | |
| 2017/0278101 A1 | 9/2017 | Moran et al. | |
| 2019/0291589 A1* | 9/2019 | Erb | G06Q 20/18 |
| 2021/0158325 A1* | 5/2021 | Mimassi | H04W 12/63 |

FOREIGN PATENT DOCUMENTS

| | | |
|---|---|---|
| CN | 203689611 U | 7/2014 |
| CN | 105550865 A | 5/2016 |
| CN | 106127462 A | 11/2016 |
| CN | 106570797 A | 4/2017 |
| CN | 107220715 A | 9/2017 |
| CN | 107590546 A | 1/2018 |
| CN | 108717652 A | 10/2018 |
| WO | 2018006717 A1 | 1/2018 |

OTHER PUBLICATIONS

Jul. 1, 2020, Chinese National Intellectual Property Administration, First Office Action in Patent Application No. CN201810276941.6, which is a foreign counterpart application corresponding to this U.S. Patent Application, to which this application claims priority.

Jun. 30, 2004; Savings Unified Version Working Group, Operation and management of postal savings business; Section 9 POS Business, p. 153.

* cited by examiner

ORDER PROCESSING

This application is a national phase of the PCT application No. PCT/CN2018/121315, filed on Dec. 14, 2018, and entitled "ORDER PROCESSING". The PCT application claims the priority to the Chinese Application No. 201810276941.6, filed on Mar. 30, 2018 and entitled "ORDER PROCESSING SYSTEM AND METHOD, ORDER SERVER, AND SECOND CLIENT." Both applications are incorporated herein by reference in its entirety.

TECHNICAL FIELD

The present disclosure relates to the field of computer technologies, and in particular, to order processing.

BACKGROUND

When an order subject to non-real-time settlement is processed, a resource involved in the order may be a currency or a virtual currency, or may be a bonus point or an electronic coupon, or the like. The order subject to non-real-time settlement usually needs to be processed based on reputation and credibility of both transaction parties.

SUMMARY

The present disclosure provides an order processing system and an order processing method.

In an aspect, the embodiments of the present disclosure provide an order processing system, including: a first client, a second client, an order server, a resource manager, and a resource transfer server, where the resource transfer server is configured to complete resource transfer according to a request of the resource manager;

either of the first client and the second client is configured to send an order preprocessing request according to an operation of a user;

the order server is configured to send a first request to the resource manager according to the received order preprocessing request and store a preprocessed order corresponding to the first request according to information that is fed back by the resource manager and that indicates that the first request is successfully processed;

the resource manager is configured to send a resource transfer request to the resource transfer server according to the first request, to transfer, through the resource transfer server, a prepaid resource from a user account corresponding to the first client to a secured account preset in the resource manager;

the second client is further configured to send an order settlement request for the preprocessed order according to an operation of a user;

the order server is further configured to send a second request to the resource manager according to the received order settlement request, where the second request includes a quantity of actually used resources; and the resource manager is further configured to transfer a remaining resource from the secured account to the user account according to the second request through the resource transfer server, where the remaining resource is obtained by subtracting the actually used resource from the prepaid resource.

In an aspect, the embodiments of the present disclosure provide an order processing method, applied to an order processing system, where the system includes: a first client, a second client, an order server, a resource manager, and a resource transfer server, and the method includes:

sending, by the order server, a first request to the resource manager according to a received order preprocessing request, so that the resource manager transfers, according to the first request through the resource transfer server, a prepaid resource from a user account corresponding to the first client to a secured account preset in the resource manager;

storing, by the order server, a preprocessed order corresponding to the first request according to information that is fed back by the resource manager and that indicates that the first request is successfully processed; and sending, by the order server, a second request to the resource manager according to a received order settlement request for the preprocessed order, so that the resource manager transfers a remaining resource from the secured account to the user account according to the second request through the resource transfer server, where the second request includes a quantity of actually used resources, and the remaining resource is obtained by subtracting the actually used resource from the prepaid resource.

In another aspect, the embodiments of the present disclosure provide an order processing method, applied to an order processing system, where the system includes: a first client, a second client, an order server, a resource manager, and a resource transfer server, and the method includes:

obtaining, by the second client, a trigger operation on a reference key;

scanning, by the second client, a second order preprocessing QR code displayed by the first client if the trigger operation is an order preprocessing operation;

generating, by the second client, an order preprocessing request according to a user identifier and a type identifier of the first client that are carried in the second order preprocessing QR code and a quantity of prepaid resources;

sending, by the second client, the order preprocessing request to the order server, so that the order server performs the following operations according to the order preprocessing request:

sending a first request to the resource manager, so that the resource manager transfers, according to the first request through the resource transfer server, the prepaid resource from a user account corresponding to the first client to a secured account preset in the resource manager; and storing a preprocessed order corresponding to the first request according to information that is fed back by the resource manager and that indicates that the first request is successfully processed; and receiving, by the second client, order preprocessing success information outputted by the order server, and storing the preprocessed order according to the order preprocessing success information.

BRIEF DESCRIPTION OF THE DRAWINGS

To describe the technical solutions of the embodiments of the present disclosure more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person skilled in the art based on the embodiments of the present disclosure without creative efforts shall fall within the protection scope of the present disclosure. Generally, when processing an order subject to non-real-time settlement, a user needs to prepay a resource for the order, and when the order is settled, a remaining resource is returned. The resource involved in the order may be a currency or a virtual currency, or may be a bonus point or an electronic coupon, or the like. The order subject to non-real-time settlement usually needs to be processed based on reputation and credibility of both transaction parties. In order processing, a resource receiver may not return a resource by rule, resulting in a resource loss of a resource payer.

Figure 1:
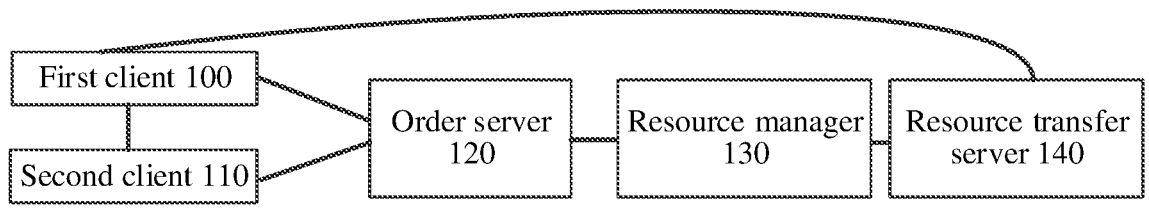
FIG. 1 is a schematic structural diagram of an order processing system according to an embodiment of the present disclosure.

Exemplarily, this embodiment discloses an order processing system. As shown in FIG. 1, the system includes: a first client 100, a second client 110, an order server 120, a resource manager 130, and a resource transfer server 140.

The resource transfer server 140 is configured to assist in completing resource transfer according to a request of the resource manager 130.

The first client 100 and the second client 110 are configured to send an order preprocessing request according to an operation of a user.

The order server 120 is configured to send a first request to the resource manager 130 according to the received order preprocessing request and store a preprocessed order corresponding to the first request according to information that is fed back by the resource manager 130 and that indicates that the first request is successfully processed.

The resource manager 130 is configured to send a resource transfer request to the resource transfer server 140 according to the first request, to transfer, through the resource transfer server 140, a prepaid resource from a user account corresponding to the first client 100 to a secured account preset in the resource manager 130.

The second client 110 is further configured to send an order settlement request for the preprocessed order according to an operation of a user.

The order server 120 is further configured to send a second request to the resource manager 130 according to the received order settlement request, where the second request includes a quantity of actually used resources.

The resource manager 130 is further configured to transfer a remaining resource from the secured account to the user account according to the second request through the resource transfer server 140, where the remaining resource is obtained by subtracting the actually used resource from the prepaid resource.

Exemplarily, the first client 100 may be client software that has a payment function on a user mobile device, and the client software may alternatively be referred to as an application (APP), for example, WeChat, Alipay, or Meituan wallet, or may be a mobile device of a user or the like that has a near field communication (NFC) function. The second client 110 may be application software that has a payment collection function on a mobile device of a merchant, for example, WeChat, Alipay, or Meituan wallet, or may be a payment collection device of a merchant, for example, a point of sale (POS) machine. A plurality of function keys are disposed on the second client 110 and are configured to trigger different order processing. The first client 100 and the second client 110 may display a picture for displaying an order preprocessing quick response (QR) code, an order processing result, and order information. The first client 100 and the second client 110 read an order preprocessing QR code through an information reading apparatus such as a camera or a code scanning apparatus, to obtain order information.

Exemplarily, the resource in the present disclosure may be an electronic resource such as a virtual currency, an electronic currency, an electronic coupon, or a bonus point. To help a reader understand the technical solutions of the present disclosure, in this embodiment, the technical solutions of the order processing system are described in detail by using an example in which a resource is an electronic currency and is applied to a hotel check-in scenario. Exemplarily, the first client 100 is a WeChat client on a mobile terminal of a hotel check-in user, the second client 110 is a Meituan wallet on a service terminal at a hotel reception, the order server 120 is a Meituan server, the resource manager 130 is a server of a bank, and the resource transfer server 140 is a WeChat server. Exemplarily, the quantity of actually used resources is a quantity of resources that is entered on the second client, for example, room expense that is actually spent by the user and that is entered by a hotel receptionist.

During hotel check-in, the user is required to first prepay an accommodation deposit. After check-out, room expense and other consumption are deducted from the deposit during settlement, and the remaining deposit is returned to the user. Exemplarily, the first client 100 or the second client 110 first sends an order preprocessing request to the order server 120. In an example, the sending, by the first client 100 and the second client 110, an order preprocessing request according to an operation of a user includes: displaying, by the second client 110, a first order preprocessing QR code in response to triggering of a reference first key configured on the second client; and reading, by the first client 100, the first order preprocessing QR code displayed by the second client 110 and sending the order preprocessing request to the order server 120.

Figure 2:
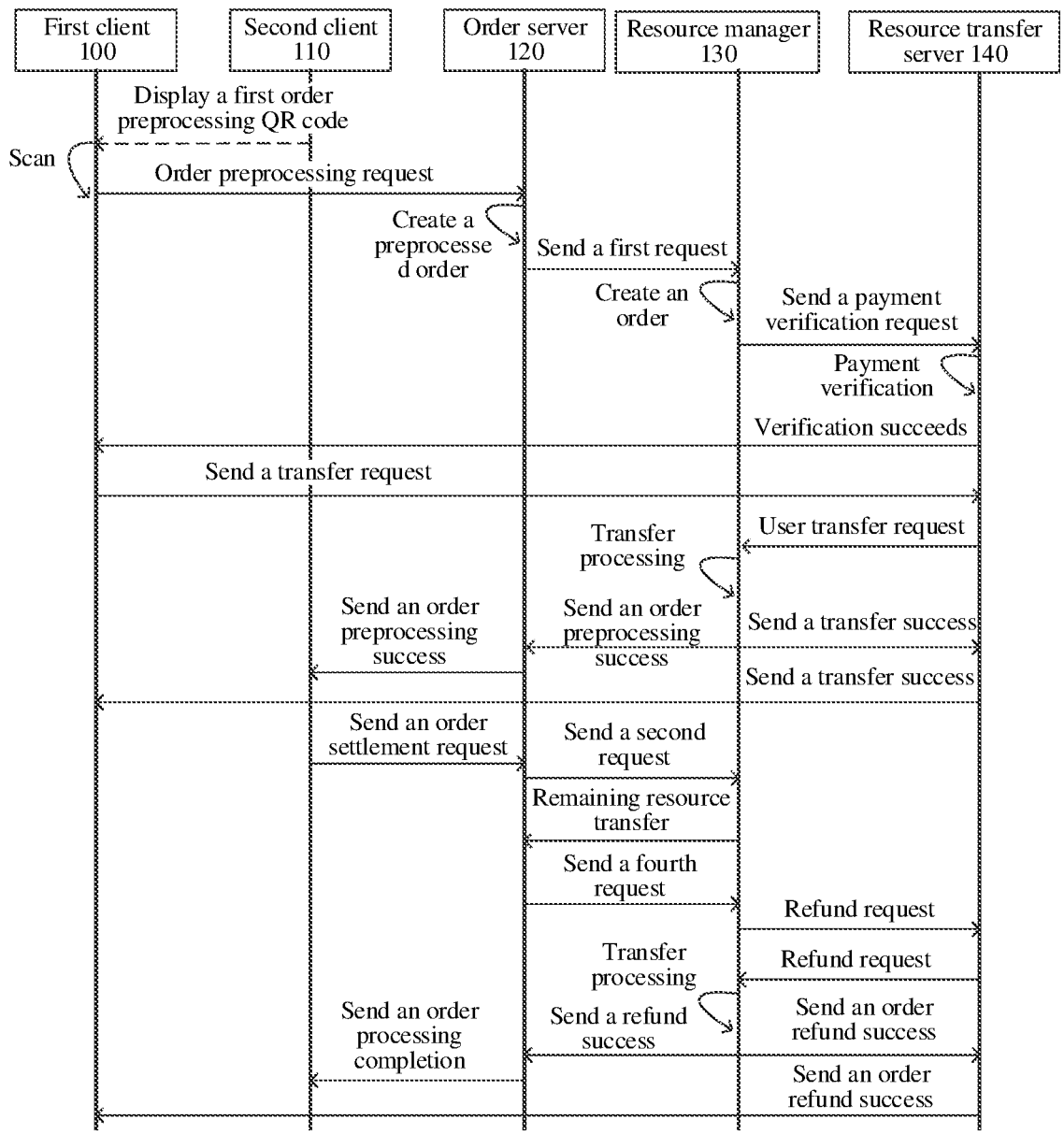
FIG. 2 is a schematic diagram of data exchange in an order processing system according to an embodiment of the present disclosure.

For example, the current hotel check-in user scans a hotel device to trigger order preprocessing. As shown in FIG. 2, first, the hotel receptionist enters a deposit amount and triggers an order preprocessing key on a payment collection POS machine, to trigger the second client 110 to display a first order preprocessing QR code. The first order preprocessing QR code is a collection QR code of the hotel, the collection QR code carries the deposit amount and merchant information, and the merchant information includes device information of the POS machine, hotel information (for example, a hotel name), and the like. Then, the hotel check-in user starts WeChat on the mobile terminal, scans the collection QR code to obtain the deposit amount of a preprocessed order, the hotel information, the device information, and the like, generates an order preprocessing request, and sends the order preprocessing request to the Meituan server (that is, the order server 120). Exemplarily, the QR code further includes address information of the Meituan server. The order preprocessing request includes, but not limited to: the deposit amount of the preprocessed order, the hotel information, the device information, a type identifier of the first client, and a current user identifier of the first client.

Then, the Meituan server (that is, the order server 120) creates the preprocessed order according to the received order preprocessing request and generates an order number. The Meituan server generates a first request according to the order number and the information included in the order preprocessing request, and sends the first request to the server (that is, the resource manager 130) of the bank, to transparently transmit the order preprocessing request to the server of the bank.

In this example, the preprocessed order is generated by the Meituan server used as the order server 120. However, this is merely an example, and is not limited in the present disclosure. For example, the preprocessed order may alternatively be generated in advance according to predetermined information of the user by the service terminal used as the second client 110 at the hotel reception, or generated when the user checks in. In this case, the order preprocessing request may be sent to the Meituan server in the form of the preprocessed order.

Subsequently, the server of the bank generates an order corresponding to the order number according to the received first request, and performs payment verification with the WeChat server (that is, the resource transfer server 140). For example, the server of the bank generates verification information according to an identifier of a first request sending party and a user identifier of the current user of the first client, and notifies the WeChat server that the user corresponding to the user identifier is to transfer money to Meituan. After the payment verification succeeds, the WeChat server notifies the first client that the verification succeeds, and the first client starts a cashier, and prompts the user to enter a transfer password, to send a transfer request to the WeChat server. Then, the WeChat server receives a transfer request of the user, and sends the transfer request of the user to the server of the bank. The server of the bank receives the transfer request of the user sent by the WeChat server, and transfers, according to the transfer request of the user, a deposit from a user account to a secured account pre-registered with the bank by Meituan. Subsequently, the server of the bank sends order payment success information to the WeChat server and the Meituan server.

After receiving the payment success information sent by the server of the bank, the Meituan server sends order prepayment success information to the POS machine of the hotel, to prompt the merchant that order prepayment is successful, and stores the preprocessed order. The preprocessed order includes, but not limited to: information such as the order number, a quantity of prepaid resources, a user identifier and/or a device identifier corresponding to the second client, and the user identifier corresponding to the first client. In addition, the WeChat server also sends the payment success information to the first client.

For an individual or a merchant without a payment license, there may be a risk of being manipulated to perform a card swiping transaction during use of a POS machine, and money may be stolen by a manipulator at any time. Moreover, these companies and individuals lack effective supervision and management and cannot provide guarantee for a resource of a user. First transferring a prepaid resource to a merchant or an individual having a payment license for temporary storage can improve security of a user resource.

When the user checks out, the hotel receptionist selects the corresponding preprocessed order, enters an actual consumption amount, and then triggers an order settlement key on the payment collection POS machine, to start an order settlement process. The hotel POS machine sends the actual consumption amount and the order number to the Meituan server through an order settlement request.

The Meituan server sends a second request to the server of the bank according to the received order settlement request. The second request includes a quantity of actually used resources, and the second request is used for notifying the server of the bank that an order of a specified order number needs to be settled. In another example, the second request may alternatively include a quantity of remaining resources.

The resource manager transfers a remaining resource from the secured account to the user account according to the second request through the WeChat server. The remaining resource is obtained by subtracting the actual consumption amount from the deposit amount.

Exemplarily, the transferring a remaining resource from the secured account to the user account according to the second request includes: transferring, by the resource manager according to the received second request, the remaining resource from the secured account to a settlement account preset in the resource manager; sending, by the order server, a fourth request to the resource manager; and transferring, by the resource manager, the remaining resource from the settlement account to the user account corresponding to the first client in the preprocessed order according to the fourth request. The settlement account is responsible for settlement for a merchant and refund for a consumer. By setting the settlement account, responsibilities of the secured account and the settlement account can be distinguished. For example, in an order preprocessing process, a prepaid resource always flows between a secured account in a bank and a user account and does not enter a settlement account, thereby implementing security assurance of the secured account and retaining integrity and universality of settlement account responsibilities. Exemplarily, the secured account and the settlement account may be accounts pre-registered with the resource manager by the order server, or may be accounts independently set for an order preprocessing service by the resource manager.

If the quantity of actual used resources is less than the quantity of prepaid resources, a remaining resource obtained by subtracting the quantity of actual used resources from the quantity of prepaid resources is transferred from the secured account to the settlement account, and the remaining resource is transferred from the settlement account to the user account. If the quantity of actual used resources is greater than or equal to the quantity of prepaid resources, the prepaid resource is transferred from the secured account to the settlement account, and settlement is performed at the hotel based on the settlement account.

For example, the Meituan server first sends a settlement request for the preprocessed order to the server of the bank. The settlement request may carry the order number and an actual consumption amount or a refund amount. The server of the bank determines, according to the order number, a secured account and a settlement account that correspond to the order, and transfers the refund amount from the secured account to the settlement account. Then, the Meituan server further sends a refund request to the server of the bank. The refund request includes the order number and the refund amount. The server of the bank transfers the refund amount from the settlement account to a user account corresponding to the order number according to the refund request. Exemplarily, when refund processing is performed on a preprocessed order, the Meituan server sends a refund request, and then the server of the bank used as the resource manager obtains account information of a user and completes refund through the WeChat server used as the resource transfer server.

Optionally, the second client is further configured to send an order cancellation request for the preprocessed order according to triggering of a reference third key; the order server is further configured to send a third request to the resource manager according to the received order cancellation request for the preprocessed order; and the resource manager is further configured to transfer the prepaid resource from the secured account to the user account according to the third request through the resource transfer server.

When the user needs to cancel the order after completing prepayment, the hotel receptionist may send an order cancellation request to the Meituan server by triggering a reference third key on the POS machine. The order cancellation request includes the order number. The Meituan server sends a third request to the server of the bank according to the received order cancellation request for the preprocessed order, and then the server of the bank transfers the deposit amount from the secured account to the user account according to the third request through the WeChat server. Exemplarily, the transferring the prepaid resource from the secured account to the user account according to the third request through the resource transfer server includes: transferring, by the resource manager according to the received third request, the prepaid resource from the secured account to a settlement account preset in the resource manager; sending, by the order server, a fourth request to the resource manager; and transferring, by the resource manager, the prepaid resource from the settlement account to the user account corresponding to the first client in the preprocessed order according to the fourth request through the resource transfer server. For an implementation in which the server of the bank transfers the deposit amount from the secured account to the user account according to the third request through the WeChat server, reference may be made to refund during settlement. The server of the bank transfers the refund amount from the settlement account to the user account corresponding to the first client in the preprocessed order according to the fourth request. Details are not described herein again.

Optionally, the order server is further configured to send a fifth request for the preprocessed order to the resource manager according to a reference time; the resource manager is further configured to transfer, according to the fifth request, an actually used resource of the preprocessed order from the secured account to a settlement account preset in the resource manager; the order server is further configured to send a sixth request to the resource manager; and the resource manager is further configured to transfer the actually used resource from the settlement account to a merchant account corresponding to the second client in the preprocessed order according to the sixth request.

For a resource of a merchant, the Meituan server performs settlement with the merchant regularly (for example, everyday). When performing settlement, the Meituan server determines a merchant identifier corresponding to each order number according to order information and determines, according to the merchant identifier, a merchant account pre-registered with Meituan by a corresponding merchant. Then, the Meituan server first sends a merchant settlement request to the server of the bank. The merchant settlement request includes an order number and a settlement amount. The server of the bank transfers the settlement amount from the secured account to a settlement account according to the merchant settlement request. Subsequently, the Meituan server sends a resource transfer request to the server of the bank. The resource transfer request includes a hotel account and a settlement amount. The server of the bank transfers the settlement amount from the settlement account to the hotel account according to the resource transfer request.

Exemplarily, the server of the bank establishes a correspondence between order numbers in the Meituan server and the WeChat server, and stores order information, to implement order mapping of different platforms.

In another embodiment of the present disclosure, alternatively, the user may generate an order preprocessing QR code, and then the POS machine of the hotel scans the order preprocessing QR code of the user and initiates an order preprocessing request. That is, the sending, by the first client and the second client, an order preprocessing request according to an operation of a user includes: displaying, by the first client, a second order preprocessing QR code according to triggering of a user; and reading, by the second client according to triggering of a reference second key, the second order preprocessing QR code displayed by the first client and sending the order preprocessing request to the order server. The technical solution in which the second client scans a QR code displayed by the first client to trigger order preprocessing is briefly described as follows:

First, the user generates a payment QR code through the WeChat client (that is, the first client) on the mobile terminal. Then, the hotel receptionist triggers the order preprocessing key of the POS machine, to start the POS machine (that is, the second client) to scan the payment QR code of the user, and obtain a type of the first client and a user identifier through the payment QR code of the user. The POS machine generates an order preprocessing request according to the obtained type of the first client, the obtained user identifier, a device identifier of the POS machine, and a deposit amount, and sends the order preprocessing request to the Meituan server. The Meituan server creates a preprocessed order according to the order preprocessing request, generates an order number, then generates a first request according to the order number and information included in the order preprocessing request, and sends the first request to the server of the bank. The server of the bank generates an order corresponding to the order number according to the received first request, and performs a payment verification with the WeChat server. For example, the server of the bank generates verification information according to an identifier of a first request sending party and a user identifier of the current user of the first client, and notifies the WeChat server that the user corresponding to the user identifier is to transfer money to Meituan. After determining that the verification succeeds, the WeChat server notifies the first client that the verification succeeds, and the first client prompts the user to enter a transfer password. Then, the WeChat server receives a transfer request of the user, and sends the transfer request of the user to the server of the bank. The server of the bank receives the transfer request of the user sent by the WeChat server, and transfers, according to the transfer request of the user, the deposit amount from a user account corresponding to the user identifier to a secured account pre-registered with the bank by Meituan. At the same time, the server of the bank sends order preprocessing success information to the Meituan server and the WeChat server.

The order preprocessing request is generated by scanning the QR code, which is convenient and fast. Exemplarily, the manner of scanning the QR code is merely an example, the manner in which the order pre-processing request is generated by scanning is not limited in this embodiment of the present disclosure. For example, in addition to the form of the QR code, it may be in the form of a barcode or the like that can be scanned. When there is no code scanning function, in another embodiment of the present disclosure, a user may alternatively enter a link address of the order server in a page displayed by the first client or the second client, enter preprocessed order-related information, for example, information such as a quantity of prepaid resources, a merchant identifier, a user identifier, and a type of the first client, generate an order preprocessing request according to the information, and then send the order preprocessing request to the order server by accessing the link address of the order server.

The order processing system disclosed in this embodiment of the present disclosure is provided with a first client, a second client, an order server, a resource manager, and a resource transfer server. The resource transfer server is configured to assist in completing resource transfer according to a request of the resource manager; the first client and the second client are configured to send an order preprocessing request according to an operation of a user; the order server is configured to send a first request to the resource manager according to the received order preprocessing request and store a preprocessed order corresponding to the first request according to information that is fed back by the resource manager and that indicates that the first request is successfully processed; the resource manager is configured to send a resource transfer request to the resource transfer server according to the first request, to transfer, through the resource transfer server, a prepaid resource from a user account corresponding to the first client to a secured account preset in the resource manager; the second client is further configured to send an order settlement request for the preprocessed order according to an operation of a user; the order server is further configured to send a second request to the resource manager according to the received order settlement request, where the second request includes a quantity of actually used resources; and the resource manager is further configured to transfer a remaining resource from the secured account to the user account according to the second request through the resource transfer server, where the remaining resource is obtained by subtracting the actually used resource from the prepaid resource. Therefore, a problem of resource security in the related art is resolved. According to the order processing system disclosed in this embodiment of the present disclosure, a resource involved in an order is transferred from a user account to a secured account managed by a resource manager for temporary storage. When the order ends, the resource is then transferred from the secured account to a settlement account, and order resource settlement is performed based on the settlement account, thereby effectively avoiding a problem of resource security that may occur when a resource is returned after a resource involved in a preprocessed order is transferred to a merchant account corresponding to a second client without resource guarantee.

During order preprocessing, the resource involved in the order is stored in the pre-registered secured account, and when settlement is performed, the resource is transferred to the settlement account to perform resource settlement, so that an order processing logic may be simplified and system stability may be improved. In addition, a transfer-in resource and a transfer-out are separately managed, thereby avoiding a resource loss of a user corresponding to the first client or the order server caused by insufficient resources corresponding to the second client and improving order processing security.

Figure 3:
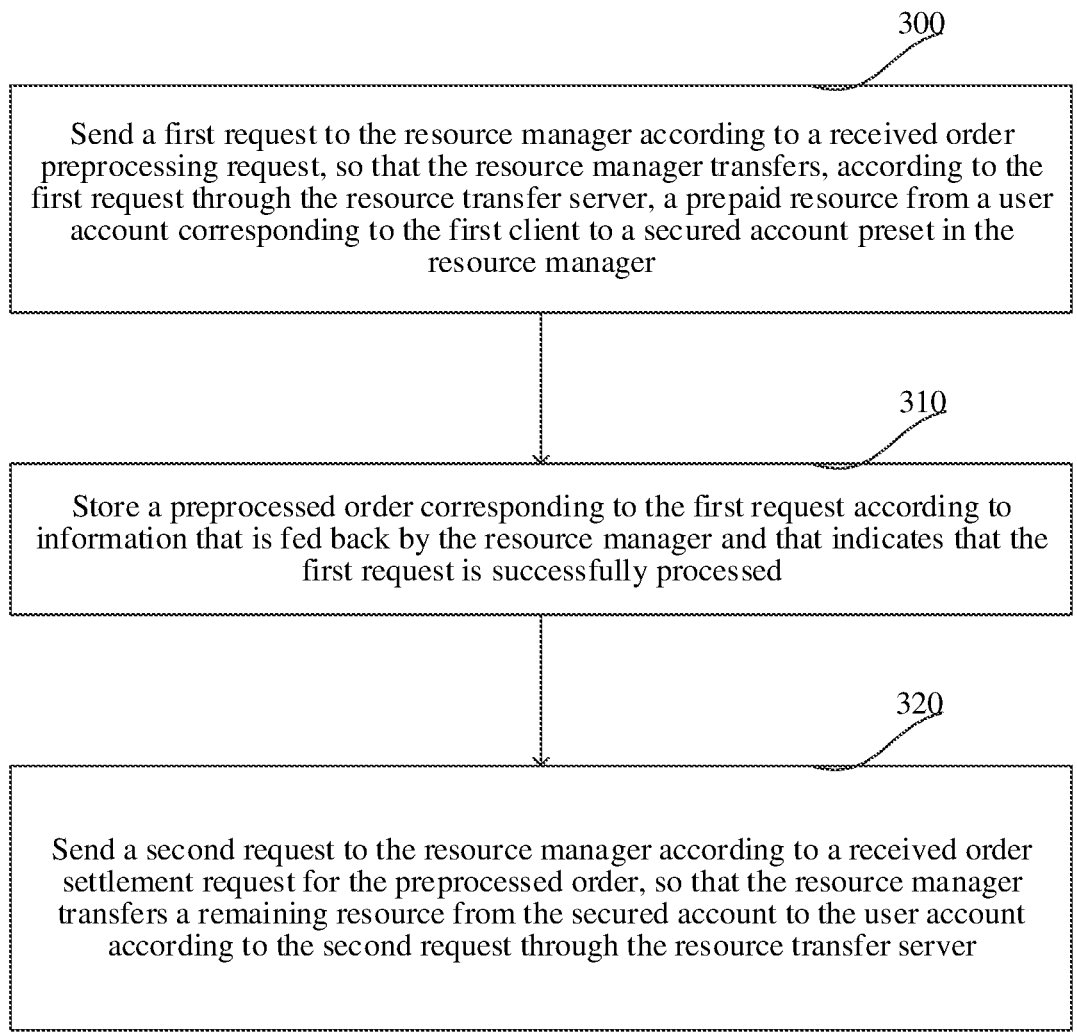
FIG. 3 is a flowchart of an order processing method according to an embodiment of the present disclosure.

Exemplarily, this embodiment discloses an order processing method, applied to an order processing system, and the order processing system includes: a first client, a second client, an order server, a resource manager, and a resource transfer server. The order processing system may be the order processing system shown in FIG. 1 and FIG. 2. As shown in FIG. 3, the method includes step 300 to step 320.

Step 300. The order server sends a first request to the resource manager according to a received order preprocessing request, so that the resource manager transfers, according to the first request through the resource transfer server, a prepaid resource from a user account corresponding to the first client to a secured account preset in the resource manager.

Exemplarily, the first client or the second client first sends the order preprocessing request to the order server. The sending, by the order server, a first request to the resource manager according to a received order preprocessing request includes: sending the first request to the resource manager according to the order preprocessing request that is sent by the first client after the first client scans a first order preprocessing QR code displayed by the second client; or sending the first request to the resource manager according to the order preprocessing request that is sent by the second client after the second client scans a second order preprocessing QR code displayed by the first client.

For example, in a hotel check-in scenario, a hotel receptionist enters a deposit amount through a payment collection POS machine (that is, the second client) and triggers an order preprocessing key on the payment collection POS machine to trigger the second client to display a first order preprocessing QR code. The first order preprocessing QR code is a collection QR code of the hotel, and the collection QR code carries the deposit amount, device information of the POS machine, and hotel information such as a hotel name. Then, a hotel check-in user starts WeChat (that is, the first client) on a mobile terminal, scans the collection QR code to obtain the deposit amount of a preprocessed order, the hotel information, the device information, and the like, generates an order preprocessing request, and sends the order preprocessing request to a Meituan server (that is, the order server). Exemplarily, the QR code includes address information of the Meituan server. The order preprocessing request includes, but not limited to: the deposit amount of the preprocessed order, the hotel information, the device information, a type identifier of the first client, and a current user identifier of the first client.

The order preprocessing request is generated by scanning the QR code, which is convenient and fast. When there is no code scanning function, a user may alternatively enter a link address of the order server in a page of the first client or the second client, enter preprocessed order-related information, for example, information such as a quantity of prepaid resources, a merchant identifier, a user identifier, and a type of the first client, generate an order preprocessing request according to the information, and then send the order preprocessing request to the order server by accessing the link address of the order server.

Then, the Meituan server creates the preprocessed order according to the received order preprocessing request, generates an order number, then generates a first request according to the order number and information included in the order preprocessing request, and sends the first request to a server (that is, the resource manager) of a bank, to transparently transmit the order preprocessing request to the server of the bank.

Subsequently, the server of the bank generates an order corresponding to the order number according to the received first request, and performs payment verification with a WeChat server (that is, the resource transfer server). For example, the server of the bank generates verification information according to an identifier of a first request sending party and a user identifier of the current user of the first client, and notifies the WeChat server that the user corresponding to the user identifier is to transfer money to Meituan. After the payment verification succeeds, the user enters a transfer password, and the WeChat server receives a transfer request of the user, and sends the transfer request of the user to the server of the bank. The server of the bank receives the transfer request of the user sent by the WeChat server, and transfers, according to the transfer request of the user, a deposit from a user account to a secured account pre-registered with the bank by Meituan. Subsequently, the server of the bank sends order preprocessing success information to the WeChat server and the Meituan server.

Exemplarily, alternatively, the user may first generate a payment QR code through the WeChat client (that is, the first client) on the mobile terminal. Then, the hotel receptionist triggers the order preprocessing key of the POS machine, to start the POS machine (that is, the second client) to scan the payment QR code (that is, the second order preprocessing QR code) of the user, and obtain a type of the first client and a user identifier through the payment QR code of the user. The POS machine generates an order preprocessing request according to the obtained type of the first client, the obtained user identifier, a device identifier of the POS machine, and a deposit amount, and sends the order preprocessing request to the Meituan server. The Meituan server creates a preprocessed order according to the order preprocessing request, generates an order number, then generates a first request according to the order number and information included in the order preprocessing request, and sends the first request to the server of the bank. The server of the bank generates an order corresponding to the order number according to the received first request, and performs a payment verification with the WeChat server. For example, the server of the bank generates verification information according to an identifier of a first request sending party and a user identifier of the current user of the first client, and notifies the WeChat server that the user corresponding to the user identifier is to transfer money to Meituan. After determining that the verification succeeds, the WeChat server notifies the first client that the verification succeeds, and the first client prompts the user to enter a transfer password. Then, the WeChat server receives a transfer request of the user, and sends the transfer request of the user to the server of the bank. The server of the bank receives the transfer request of the user sent by the WeChat server, and transfers, according to the transfer request of the user, the deposit amount from a user account corresponding to the user identifier to a secured account of Meituan. At the same time, the server of the bank sends order preprocessing success information to the Meituan server and the WeChat server.

For an individual or a merchant without a payment license, there may be a risk of being manipulated to perform a card swiping transaction during use of a POS machine, and money may be stolen by a manipulator at any time. Moreover, these companies and individuals lack effective supervision and management and cannot provide guarantee for a resource of a user. First transferring a prepaid resource to a merchant or an individual having a payment license for temporary storage can improve security of a user resource.

Step 310. Store a preprocessed order corresponding to the first request according to information that is fed back by the resource manager and that indicates that the first request is successfully processed.

After receiving payment success information sent by the server of the bank, the Meituan server sends order prepayment success information to the POS machine of the hotel, to prompt a merchant that order prepayment is successful. The Meituan server stores the preprocessed order corresponding to the first request. The preprocessed order includes: information such as the order number, the quantity of prepaid resources, a user identifier and/or a device identifier corresponding to the second client, and a user identifier corresponding to the first client.

The WeChat server also sends the payment success information to the first client.

Step 320. The order server sends a second request to the resource manager according to a received order settlement request for the preprocessed order, so that the resource manager transfers a remaining resource from the secured account to the user account according to the second request through the resource transfer server, where the remaining resource is obtained by subtracting an actually used resource from the prepaid resource.

When the user checks out, the hotel receptionist selects the corresponding preprocessed order, enters an actual consumption amount, and then triggers an order settlement key on the payment collection POS machine, to start an order settlement process. The hotel POS machine sends the actual consumption amount and the order number to the Meituan server through an order settlement request.

The Meituan server sends a second request to the server of the bank according to the received order settlement request. The second request includes a quantity of actually used resources, and the second request is used for notifying the server of the bank that an order of a specified order number needs to be settled for a user.

The resource manager transfers a remaining resource from the secured account to the user account according to the second request. The remaining resource is obtained by subtracting the actual consumption amount from the deposit amount.

Exemplarily, the transferring a remaining resource from the secured account to the user account according to the second request includes: transferring, by the resource manager according to the received second request, the remaining resource from the secured account to a settlement account preset in the resource manager; sending, by the order server, a fourth request to the resource manager; and transferring, by the resource manager, the remaining resource from the settlement account to the user account corresponding to the first client in the preprocessed order according to the fourth request.

If the quantity of actual used resources is less than the prepaid resource, a remaining resource obtained by subtracting the quantity of actual used resources from the quantity of prepaid resources is transferred from the secured account to the settlement account, and the remaining resource is transferred from the settlement account to the user account. If the quantity of actual used resources is greater than or equal to the quantity of prepaid resources, the prepaid resource is transferred from the secured account to the settlement account, and settlement is performed at the hotel based on the settlement account.

For example, the Meituan server first sends a user settlement request for the preprocessed order to the server of the bank, and sends a refund amount and the order number to the server of the bank. The server of the bank determines, according to the order number, a secured account and a pre-registered settlement account that correspond to the order, and transfers the refund amount from the secured account to the settlement account. Then, the Meituan server further sends a refund request to the server of the bank. The refund request includes the order number and the refund amount. The server of the bank transfers the refund amount from the settlement account to a user account corresponding to the order number according to the refund request.

Exemplarily, after order preprocessing and order processing are completed, the order server stores a piece of order processing information, including information such as an order number, an order status, and an order processing time. The order number is a number generated after an order preprocessing request is received, and is used for identifying an order of the order server, the order status is used for identifying whether processing of the order is completed and whether the order is successful, and the order processing time is used for identifying a time at which order preprocessing or processing is completed. When the order processing is completed, and after the order server sends the second request, a specific resource returning operation is completed through interaction between the resource manager and the resource transfer server, and the order server cannot obtain a specific time at which the resource is transferred to a user account. Therefore, the order server determines a system time after the second request is sent as an order processing completion time.

Exemplarily, after the resource manager successfully returns a resource, an order settlement process ends. If the resource manager fails to return a resource, the order server repeatedly sends the second request to the resource manager according to a policy of doubling a request interval each time, until refund succeeds. If the resource cannot be successfully returned until 24:00 that day, the resource is returned manually.

Exemplarily, the first client may alternatively be a client that has a code scanning payment function such as an Alipay client or a Meituan wallet client. The resource manager determines, according to a type of the first client in a first request, to communicate with a corresponding resource transfer server, to complete resource transfer.

According to the order processing method disclosed in this embodiment of the present disclosure, a first request is sent to the resource manager according to a received order preprocessing request, so that the resource manager transfers, according to the first request through the resource transfer server, a prepaid resource from a user account corresponding to the first client to a secured account preset in the resource manager; a preprocessed order corresponding to the first request is stored according to information that is fed back by the resource manager and that indicates that the first request is successfully processed; and a second request is sent to the resource manager according to a received order settlement request for the preprocessed order, so that the resource manager transfers a remaining resource from the secured account to the user account according to the second request through the resource transfer server, where the remaining resource is obtained by subtracting the actually used resource from the prepaid resource. Therefore, a problem of resource security in the related art is resolved. According to the order processing method disclosed in this embodiment of the present disclosure, a resource involved in an order is transferred from a user account to a secured account managed by a resource manager for temporary storage. When the order ends, the resource is then transferred from the secured account to a settlement account, and order resource settlement is performed based on the settlement account, thereby effectively avoiding a problem of resource security that may occur when a resource is returned after a resource involved in a preprocessed order is transferred to a merchant account corresponding to a second client without resource guarantee.

During order preprocessing, the resource involved in the order is stored in the pre-registered secured account, and when settlement is performed, the resource is transferred to the settlement account to perform resource settlement, so that an order processing logic may be simplified and system stability may be improved. In addition, a transfer-in resource and a transfer-out are separately managed, thereby avoiding a resource loss of a user corresponding to the first client or the order server caused by insufficient resources corresponding to the second client and improving order processing security.

Figure 4:
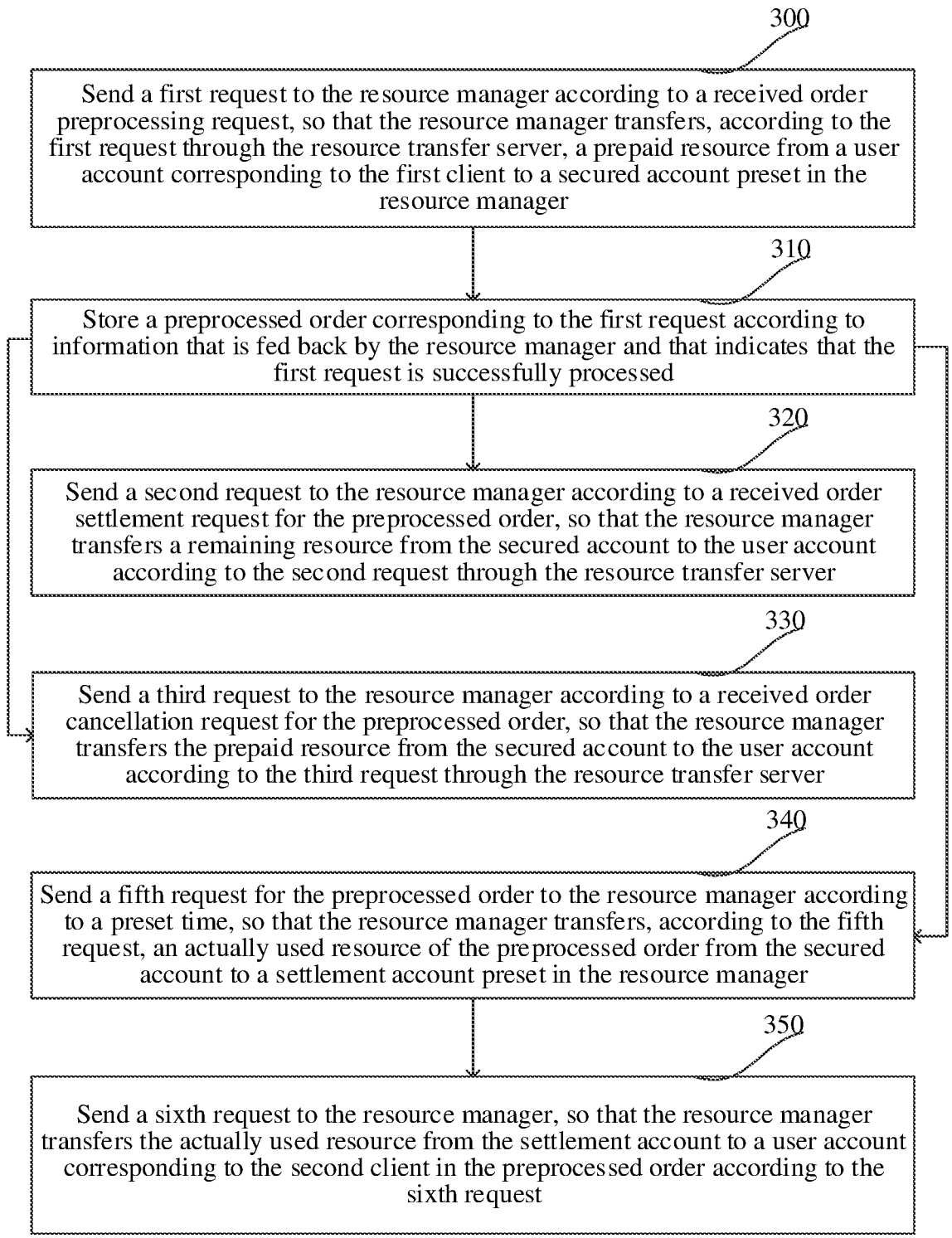
FIG. 4 is a flowchart of an order processing method according to an embodiment of the present disclosure.

Based on the embodiment shown in FIG. 3, this embodiment discloses an order processing method. As shown in FIG. 4, the method further includes step 330 to step 350.

Step 330. The order server sends a third request to the resource manager according to a received order cancellation request for the preprocessed order, so that the resource manager transfers the prepaid resource from the secured account to the user account according to the third request through the resource transfer server.

Exemplarily, after the storing, by the order server, a preprocessed order corresponding to the first request according to information that is fed back by the resource manager and that indicates that the first request is successfully processed, the method further includes: sending a third request to the resource manager according to a received order cancellation request for the preprocessed order, so that the resource manager transfers the prepaid resource from the secured account to the user account according to the third request through the resource transfer server.

When the user needs to cancel the order after completing prepayment, the hotel receptionist may send an order cancellation request to the Meituan server by triggering a reference third key on the POS machine. The order cancellation request includes the order number. The Meituan server sends a third request to the server of the bank according to the received order cancellation request for the preprocessed order, and then the server of the bank transfers the deposit amount from the secured account to the user account according to the third request through the WeChat server. Exemplarily, the transferring the prepaid resource from the secured account to the user account according to the third request through the resource transfer server includes: transferring, by the resource manager according to the received third request, the prepaid resource from the secured account to a settlement account preset in the resource manager; sending, by the order server, a fourth request to the resource manager; and transferring, by the resource manager, the prepaid resource from the settlement account to the user account corresponding to the first client in the preprocessed order according to the fourth request. For an implementation in which the server of the bank transfers the deposit amount from the secured account to the user account according to the third request through the WeChat server, reference may be made to refund during settlement. The server of the bank transfers the refund amount from the settlement account to the user account corresponding to the first client in the preprocessed order according to the fourth request. Details are not described herein again.

Exemplarily, after the storing a preprocessed order corresponding to the first request according to information that is fed back by the resource manager and that indicates that the first request is successfully processed, the method further includes step 340 and step 350.

Step 340. The order server sends a fifth request for the preprocessed order to the resource manager according to a reference time, so that the resource manager transfers, according to the fifth request, an actually used resource of the preprocessed order within the reference time from the secured account to a settlement account preset in the resource manager.

Step 350. The order server sends a sixth request to the resource manager, so that the resource manager transfers the actually used resource within the reference time from the settlement account to a merchant account corresponding to the second client in the preprocessed order according to the sixth request.

For a resource of a merchant, the Meituan server performs settlement with the merchant regularly (for example, everyday). When performing settlement, the Meituan server determines a merchant identifier corresponding to each order number according to order information and determines, according to the merchant identifier, a merchant account pre-registered with Meituan by a corresponding merchant. Then, the Meituan server first sends a merchant settlement request to the server of the bank. The merchant settlement request includes an order number and a settlement amount. The server of the bank transfers the settlement amount from the secured account to a settlement account according to the merchant settlement request. Subsequently, the Meituan server sends a resource transfer request to the server of the bank. The resource transfer request includes a hotel account and a settlement amount. The server of the bank transfers the settlement amount from the settlement account to a merchant account according to the resource transfer request.

Exemplarily, the server of the bank establishes a correspondence between order numbers in the Meituan server and the WeChat server, and stores order information, to implement order mapping of different platforms.

According to the order processing method disclosed in this embodiment of the present disclosure, a resource involved in an order is stored in a pre-registered secured account, and when settlement is performed, the resource is transferred to a settlement account to perform resource settlement, so that an order processing logic may be simplified and system stability may be improved. In addition, a transfer-in resource and a transfer-out are separately managed, thereby avoiding a resource loss of a user corresponding to the first client or the order server caused by insufficient resources corresponding to the second client and improving order processing security.

Figure 5:
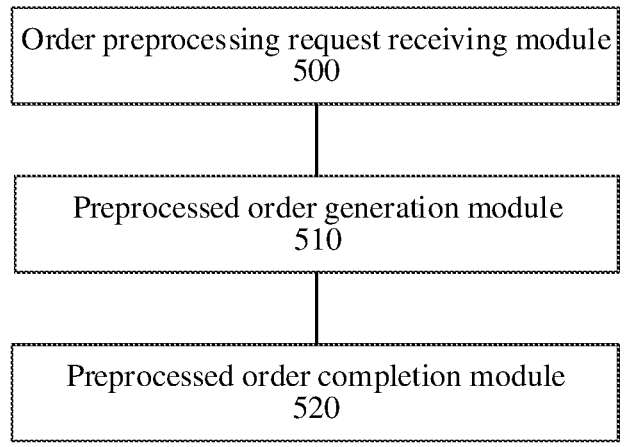
FIG. 5 is a schematic structural diagram of an order server according to an embodiment of the present disclosure.

Correspondingly, this embodiment discloses an order server, applied to an order processing system, and the system includes: a first client, a second client, an order server, a resource manager, and a resource transfer server. The order processing system may be the order processing system shown in FIG. 1 and FIG. 2. As shown in FIG. 5, the order server includes the following modules.

An order preprocessing request receiving module 500 is configured to send a first request to the resource manager according to a received order preprocessing request, so that the resource manager transfers, according to the first request through the resource transfer server, a prepaid resource from a user account corresponding to the first client to a secured account preset in the resource manager.

A preprocessed order generation module 510 is configured to store a preprocessed order corresponding to the first request according to information that is fed back by the resource manager and that indicates that the first request is successfully processed.

A preprocessed order completion module 520 is configured to send a second request to the resource manager according to a received order settlement request for the preprocessed order, so that the resource manager transfers a remaining resource from the secured account to the user account according to the second request through the resource transfer server, where the remaining resource is obtained by subtracting an actually used resource from the prepaid resource.

Optionally, the transferring a remaining resource from the secured account to the user account according to the second request through the resource transfer server includes: transferring, by the resource manager according to the received second request, the remaining resource from the secured account to a settlement account preset in the resource manager; sending, by the order server, a fourth request to the resource manager; and transferring, by the resource manager, the remaining resource from the settlement account to the user account corresponding to the first client in the preprocessed order according to the fourth request.

Figure 6:
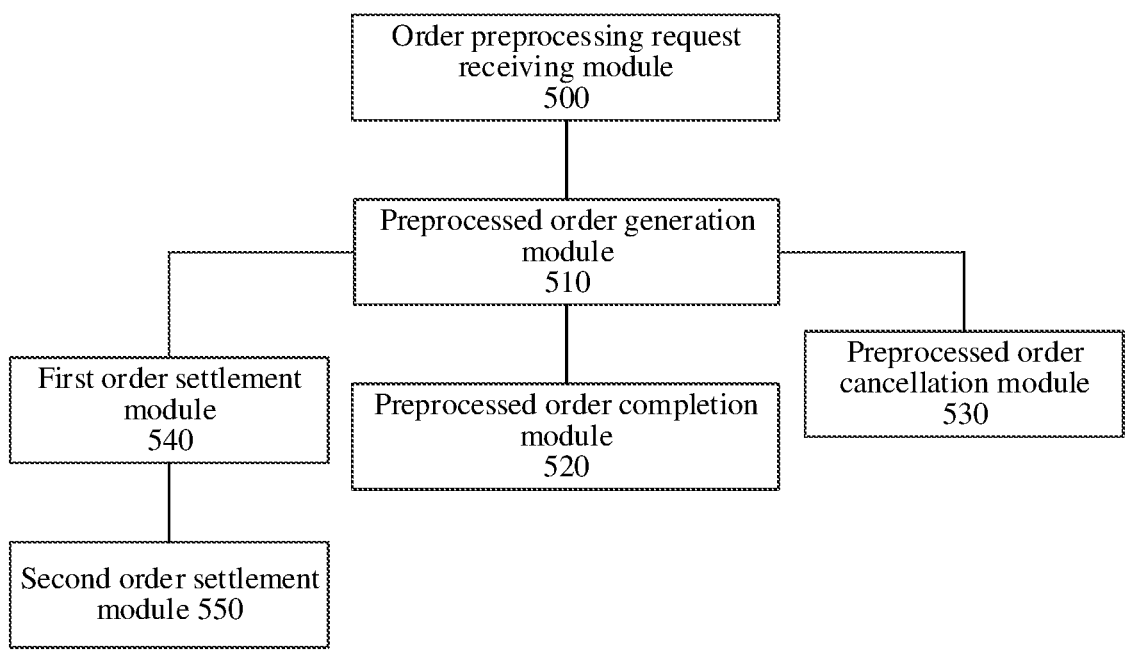
FIG. 6 is another schematic structural diagram of the order server according to an embodiment of the present disclosure.

Optionally, as shown in FIG. 6, the order server further includes the following module.

A preprocessed order cancellation module 530 is configured to send a third request to the resource manager according to a received order cancellation request for the preprocessed order, so that the resource manager transfers the prepaid resource from the secured account to the user account according to the third request through the resource transfer server.

Optionally, the transferring the prepaid resource from the secured account to the user account according to the third request through the resource transfer server includes: transferring, by the resource manager according to the received third request, the prepaid resource from the secured account to a settlement account preset in the resource manager; sending, by the order server, a fourth request to the resource manager; and transferring, by the resource manager, the prepaid resource from the settlement account to the user account corresponding to the first client in the preprocessed order according to the fourth request.

Optionally, as shown in FIG. 6, the order server further includes the following modules.

A first order settlement module 540 is configured to send a fifth request for the preprocessed order to the resource manager according to a reference time, so that the resource manager transfers, according to the fifth request, an actually used resource of the preprocessed order within the reference time from the secured account to a settlement account preset in the resource manager.

A second order settlement module 550 is configured to send a sixth request to the resource manager, so that the resource manager transfers the actually used resource within the reference time from the settlement account to a merchant account corresponding to the second client in the preprocessed order according to the sixth request.

Optionally, the sending a first request to the resource manager according to a received order preprocessing request includes: sending the first request to the resource manager according to the order preprocessing request that is sent by the first client after the first client scans a first order preprocessing QR code displayed by the second client; or sending the first request to the resource manager according to the order preprocessing request that is sent by the second client after the second client scans a second order preprocessing QR code displayed by the first client.

This embodiment is an apparatus embodiment corresponding to the order processing method embodiments shown in FIG. 2 and FIG. 3. For the modules and implementations, refer to implementations of corresponding steps in the embodiments corresponding to FIG. 2 and FIG. 3. Details are not described herein again.

The order server disclosed in this embodiment of the present disclosure sends a first request to the resource manager according to a received order preprocessing request, so that the resource manager transfers, according to the first request, a prepaid resource from a user account corresponding to the first client to a secured account preset in the resource manager; stores a preprocessed order corresponding to the first request according to information that is fed back by the resource manager and that indicates that the first request is successfully processed; and sends a second request to the resource manager according to a received order settlement request for the preprocessed order, so that the resource manager transfers a remaining resource from the secured account to the user account according to the second request, where the remaining resource is obtained by subtracting the actually used resource from the prepaid resource. Therefore, a problem of resource security in the related art is resolved. According to the order server disclosed in this embodiment of the present disclosure, a resource involved in an order is transferred from a user account to a secured account managed by a resource manager for temporary storage. When the order ends, the resource is then transferred from the secured account to a settlement account, and order resource settlement is performed based on the settlement account, thereby effectively avoiding a problem of resource security that may occur when a resource is returned after a resource involved in a preprocessed order is transferred to a merchant account corresponding to a second client without a payment license.

During order preprocessing, the resource involved in the order is stored in the pre-registered secured account, and when settlement is performed, the resource is transferred to the settlement account to perform resource settlement, so that an order processing logic may be simplified and system stability may be improved. In addition, a transfer-in resource and a transfer-out are separately managed, thereby avoiding a resource loss of a user corresponding to the first client or the order server caused by insufficient user resources corresponding to the second client and improving order processing security.

Figure 7:
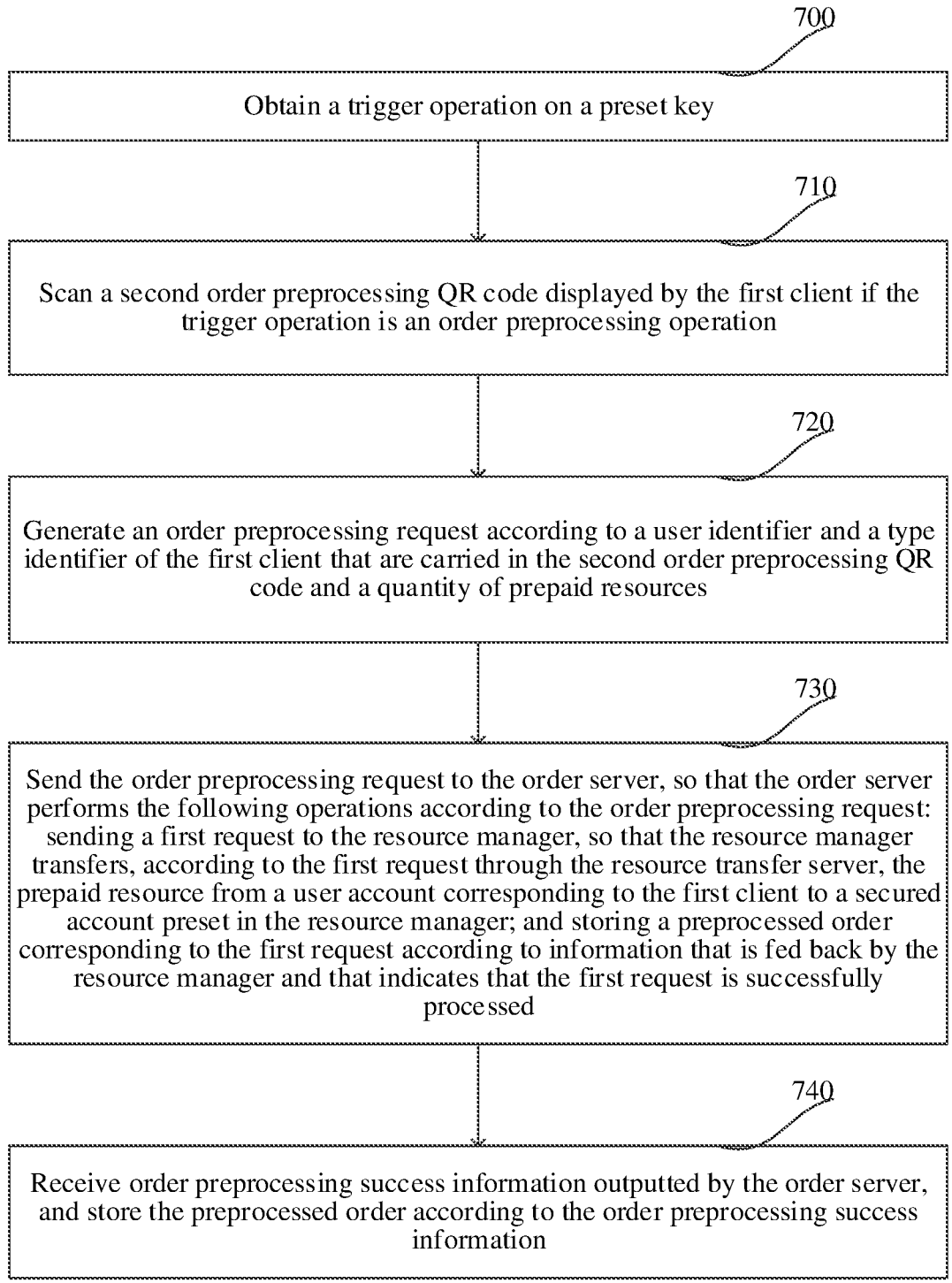
FIG. 7 is a flowchart of an order processing method according to an embodiment of the present disclosure.

Further, this embodiment discloses an order processing method, applied to an order processing system, and the system includes: a first client, a second client, an order server, a resource manager, and a resource transfer server. The order processing system may be the order processing system shown in FIG. 1 and FIG. 2. As shown in FIG. 7, the method includes step 700 to step 740.

Step 700. The second client obtains a trigger operation on a reference key.

Exemplarily, reference is made to a plurality of function keys by the second client and are configured to trigger different order processing. The function key may be a physical key, or may be a virtual key. The trigger operation on the reference key may be obtained by using a common method in the related art.

Step 710. The second client scans a second order preprocessing QR code displayed by the first client if the trigger operation is an order preprocessing operation.

A type of the trigger operation may be determined according to the triggered key. Exemplarily, the trigger operation includes, but is not limited to, any one of the following: an order preprocessing operation, an order settlement operation, and an order cancellation operation.

When a user performs the order preprocessing operation, the second client scans a second order preprocessing QR code displayed by the first client.

For example, a hotel check-in user displays a payment/collection QR code through the first client (for example, a WeChat client on a mobile terminal), and then after entering a deposit amount by using the second client, a hotel receptionist presses an order prepayment collection key of the second client, and scans, by using the second client, the payment/collection QR code displayed by the first client.

Step 720. The second client generates an order preprocessing request according to a user identifier and a type identifier of the first client that are carried in the second order preprocessing QR code and a quantity of prepaid resources.

Exemplarily, the second order preprocessing QR code carries a user identifier and a type identifier of the first client, and the second client generates an order preprocessing request according to the deposit amount entered by the hotel receptionist and the user identifier and the type identifier of the first client that are carried in the second order preprocessing QR code.

Step 730. The second client sends the order preprocessing request to the order server, so that the order server performs the following operations according to the order preprocessing request: sending a first request to the resource manager, so that the resource manager transfers, according to the first request through the resource transfer server, the prepaid resource from a user account corresponding to the first client to a secured account preset in the resource manager; and storing a preprocessed order corresponding to the first request according to information that is fed back by the resource manager and that indicates that the first request is successfully processed.

The second client sends the order preprocessing request to the order server through a network, to apply for order prepayment collection. Exemplarily, after receiving the order preprocessing request, the order server performs the following operations according to the order preprocessing request: sending a first request to the resource manager, so that the resource manager transfers, according to the first request through the resource transfer server, a prepaid resource from a user account corresponding to the first client to a secured account preset in the resource manager; and storing a preprocessed order corresponding to the first request according to information that is fed back by the resource manager and that indicates that the first request is successfully processed, and outputting order preprocessing success information.

For a solution in which the order server performs order prepayment collection according to the received order preprocessing request, refer to the technical solutions corresponding to FIG. 1 to FIG. 4 in the description. Details are not described in this embodiment again.

Step 740. Receive order preprocessing success information outputted by the order server, and store the preprocessed order according to the order preprocessing success information.

After completing deposit transfer through the resource manager, the order server sends order preprocessing success information to the second client. After receiving the order preprocessing success information outputted by the order server, the second client stores a preprocessed order according to the order preprocessing success information and displays an order preprocessing success prompt.

Figure 8:
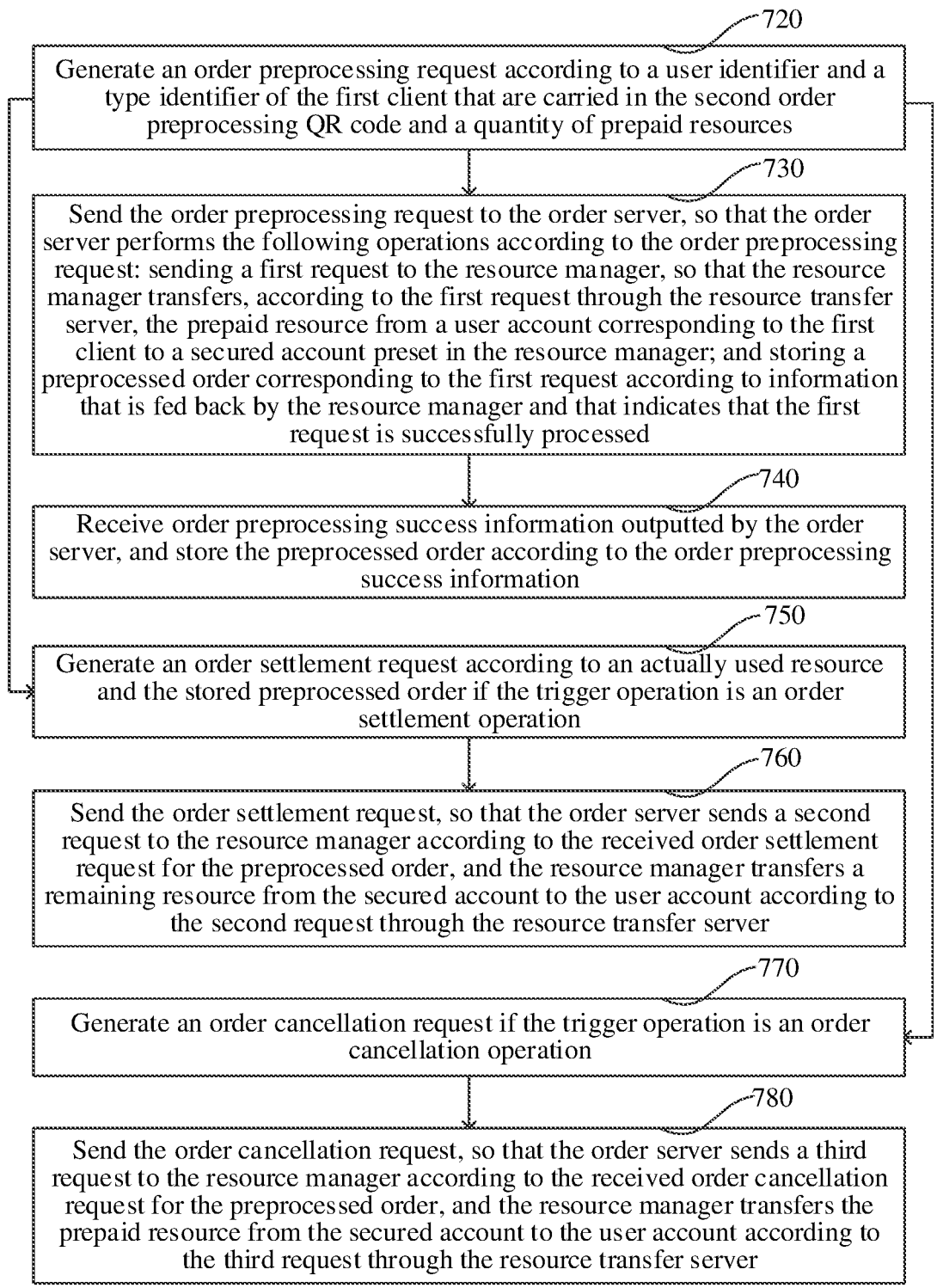
FIG. 8 is a flowchart of the order processing method according to an embodiment of the present disclosure.

Based on the order processing method shown in FIG. 7, as shown in FIG. 8, in another embodiment of the present disclosure, after the step of obtaining a trigger operation on a reference key, the method further includes step 750 and step 760.

Step 750. The second client generates an order settlement request according to an actually used resource and the stored preprocessed order if the trigger operation is an order settlement operation.

Step 760. The second client sends the order settlement request, so that the order server sends a second request to the resource manager according to the received order settlement request for the preprocessed order, and the resource manager transfers a remaining resource from the secured account to the user account according to the second request through the resource transfer server, where the remaining resource is obtained by subtracting the actually used resource from the prepaid resource.

For example, when the check-in user performs settlement at a hotel reception, the hotel receptionist selects the preprocessed order through the second client, enters an actually used resource, and triggers a settlement key on the second client. The second client determines that the trigger operation is an order settlement operation according to the triggered key, and generates an order settlement request according to the actually used resource and the selected preprocessed order.

Then, the second client sends the order settlement request to the order server, so that the order server sends a second request to the resource manager according to the received order settlement request for the preprocessed order, and the resource manager transfers a remaining resource from the secured account to the user account according to the second request through the resource transfer server, where the remaining resource is obtained by subtracting the actually used resource from the prepaid resource. Exemplarily, the transferring a remaining resource from the secured account to the user account according to the second request through the resource transfer server includes: transferring, by the resource manager according to the received second request, the remaining resource from the secured account to a settlement account preset in the resource manager; sending, by the order server, a fourth request to the resource manager; and transferring, by the resource manager, the remaining resource from the settlement account to the user account corresponding to the first client in the preprocessed order according to the fourth request.

For a technical solution in which the order server sends a second request to the resource manager according to the received order settlement request for the preprocessed order and the resource manager transfers a remaining resource from the secured account to the user account according to the second request through the resource transfer server, refer to related descriptions corresponding to FIG. 1 to FIG. 4. Details are not described in this embodiment again.

Based on the embodiment shown in FIG. 7, as shown in FIG. 8, in another embodiment of the present disclosure, after the obtaining a trigger operation on a reference key, the method further includes step 770 and step 780.

Step 770. The second client generates an order cancellation request if the trigger operation is an order cancellation operation.

Step 780. The second client sends the order cancellation request, so that the order server sends a third request to the resource manager according to the received order cancellation request for the preprocessed order, and the resource manager transfers the prepaid resource from the secured account to the user account according to the third request through the resource transfer server.

In another example, when the check-in user applies at the hotel reception for prepayment cancellation, the hotel receptionist selects the preprocessed order through the second client and triggers an order cancellation key on the second client. The second client determines that the trigger operation is an order cancellation operation according to the triggered key, and generates an order cancellation request according to the preprocessed order.

Then, the second client sends the order cancellation request to the order server, so that the order server sends a third request to the resource manager according to the received order cancellation request for the preprocessed order, and the resource manager transfers the prepaid resource from the secured account to the user account according to the third request through the resource transfer server. Exemplarily, the transferring, by the resource manager, the prepaid resource from the secured account to the user account according to the third request through the resource transfer server includes: transferring, by the resource manager according to the received third request, the prepaid resource from the secured account to a settlement account preset in the resource manager; sending, by the order server, a fourth request to the resource manager; and transferring, by the resource manager, the prepaid resource from the settlement account to the user account corresponding to the first client in the preprocessed order according to the fourth request.

For a technical solution in which the order server sends a third request to the resource manager according to the received order cancellation request for the preprocessed order and the resource manager transfers the prepaid resource from the secured account to the user account according to the third request through the resource transfer server, refer to related descriptions corresponding to FIG. 1 to FIG. 4. Details are not described in this embodiment again.

According to the order processing method disclosed in this embodiment of the present disclosure, an order preprocessing request is generated according to a trigger operation of triggering a reference key on the second client, and the order preprocessing request is sent to the order server, so that the order server completes order prepayment through the resource manager and the resource transfer server; and then the order server further completes settlement or resource returning through the resource manager and the resource transfer server according to an order settlement operation or an order cancellation operation inputted on the second client, thereby resolving a resource security problem in the related art. According to the order processing method disclosed in this embodiment of the present disclosure, a resource involved in an order is transferred from a user account to a secured account managed by a resource manager for temporary storage. When the order ends or is canceled, the resource is then transferred from the secured account to a settlement account, and order resource settlement is performed based on the settlement account, thereby effectively avoiding a problem of resource security that may occur when a resource is returned after a resource involved in a preprocessed order is transferred to a merchant account corresponding to a second client without resource guarantee.

During order preprocessing, the resource involved in the order is stored in the pre-registered secured account, and when settlement is performed, the resource is transferred to the settlement account to perform resource settlement, so that an order processing logic may be simplified and system stability may be improved. In addition, a transfer-in resource and a transfer-out are separately managed, thereby avoiding a resource loss of a user corresponding to the first client or the order server caused by insufficient user resources corresponding to the second client and improving order processing security.

Figure 9:
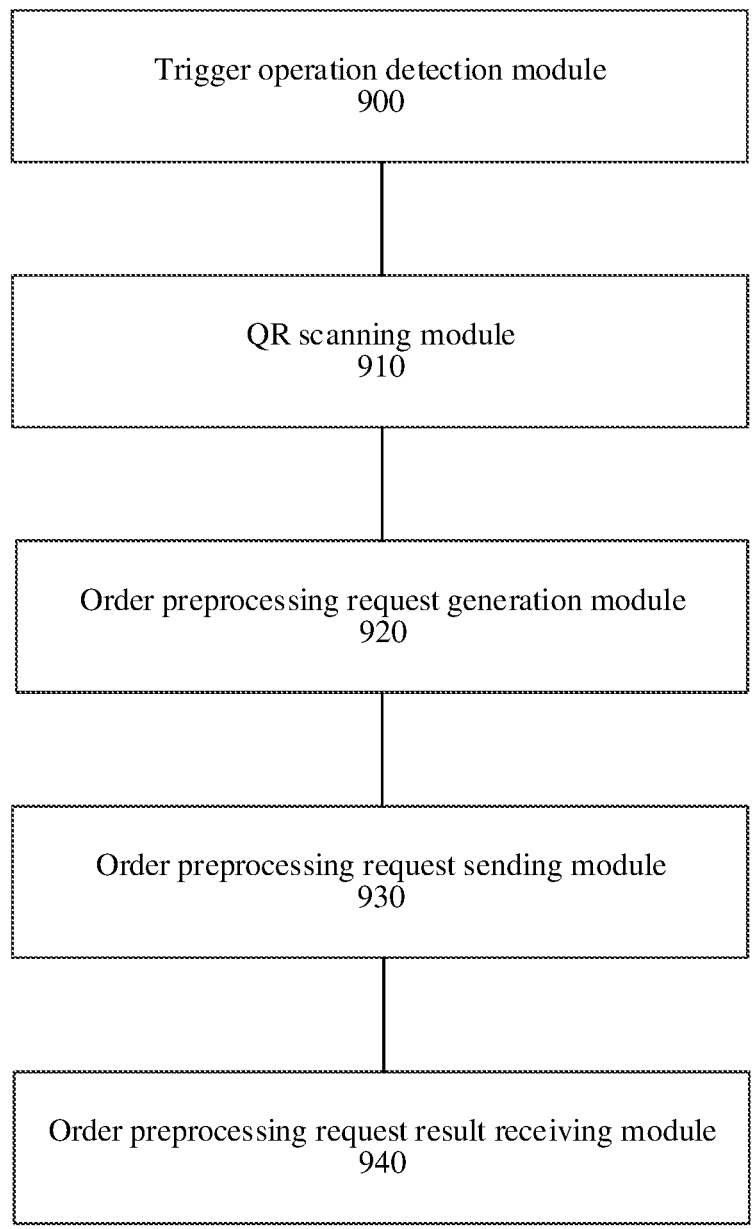
FIG. 9 is a schematic structural diagram of a second client according to an embodiment of the present disclosure.

Correspondingly, this embodiment discloses a second client, applied to an order processing system, and the system includes: a first client, a second client, an order server, a resource manager, and a resource transfer server. The order processing system may be the order processing system shown in FIG. 1 and FIG. 2. Optionally, as shown in FIG. 9, the second client includes the following modules.

A trigger operation detection module 900 is configured to obtain a trigger operation on a reference key.

A QR code scanning module 910 is configured to scan a second order preprocessing QR code displayed by the first client if the trigger operation is an order preprocessing operation.

An order preprocessing request generation module 920 is configured to generate an order preprocessing request according to a user identifier and a type identifier of the first client that are carried in the second order preprocessing QR code and a quantity of prepaid resources.

An order preprocessing request sending module 930 is configured to send the order preprocessing request to the order server, so that the order server performs the following operations according to the order preprocessing request: sending a first request to the resource manager, so that the resource manager transfers, according to the first request through the resource transfer server, the prepaid resource from a user account corresponding to the first client to a secured account preset in the resource manager; and storing a preprocessed order corresponding to the first request according to information that is fed back by the resource manager and that indicates that the first request is successfully processed.

An order preprocessing request result receiving module 940 is configured to receive order preprocessing success information outputted by the order server, and store the preprocessed order according to the order preprocessing success information.

Figure 10:
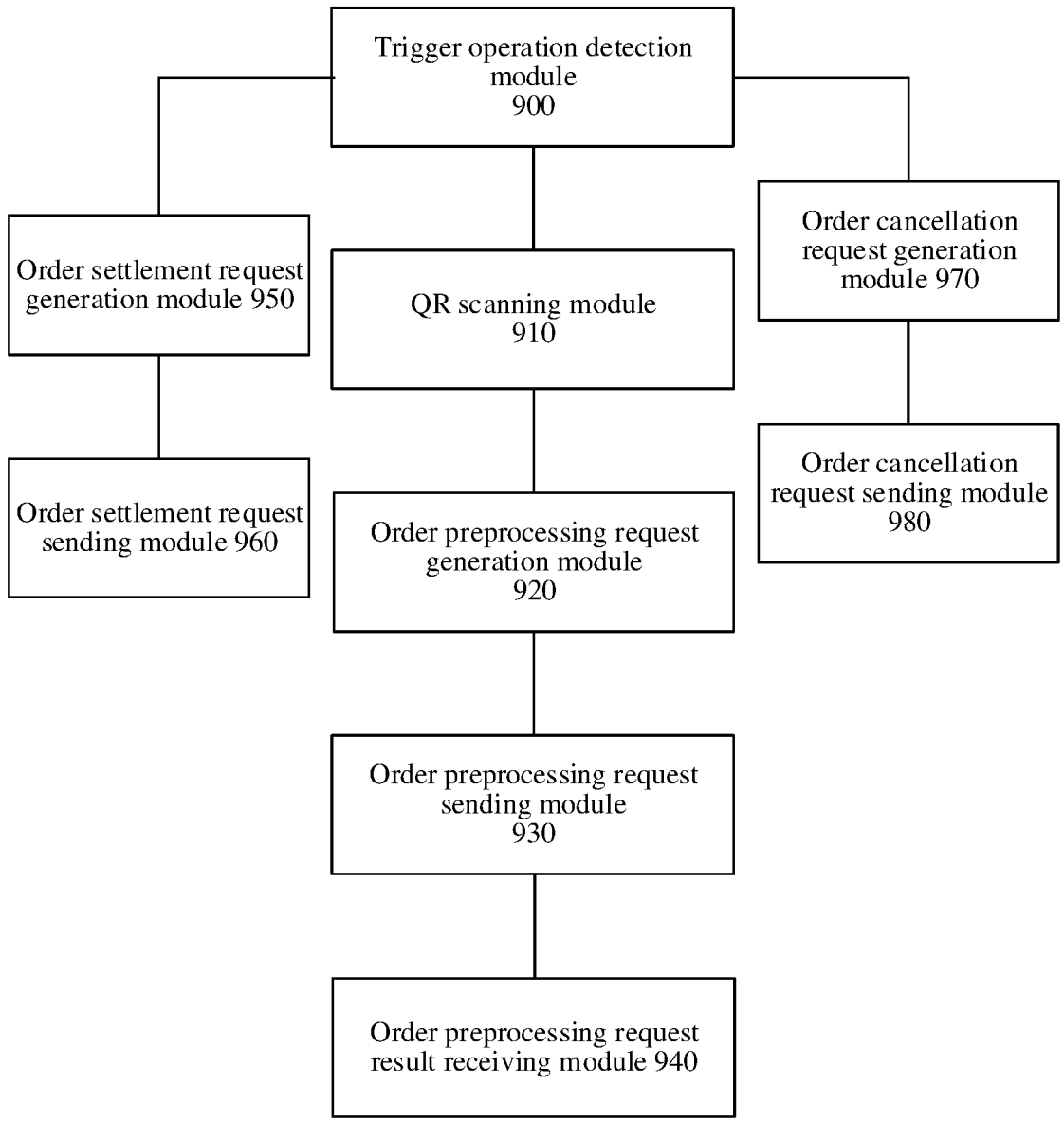
FIG. 10 is another schematic structural diagram of the second client according to an embodiment of the present disclosure.

Optionally, as shown in FIG. 10, the second client further includes the following modules.

An order settlement request generation module 950 is configured to generate an order settlement request according to an actually used resource and the stored preprocessed order if the trigger operation is an order settlement operation.

An order settlement request sending module 960 is configured to send the order settlement request, so that the order server sends a second request to the resource manager according to the received order settlement request for the preprocessed order, and the resource manager transfers a remaining resource from the secured account to the user account according to the second request through the resource transfer server, where the second request carries a quantity of actually used resources, and the remaining resource is obtained by subtracting the actually used resource from the prepaid resource.

Optionally, as shown in FIG. 10, the second client further includes the following modules.

An order cancellation request generation module 970 is configured to generate an order cancellation request if the trigger operation is an order cancellation operation.

An order cancellation request sending module 980 is configured to send the order cancellation request, so that the order server sends a third request to the resource manager according to the received order cancellation request for the preprocessed order, and the resource manager transfers the prepaid resource from the secured account to the user account according to the third request through the resource transfer server.

Exemplarily, the transferring, by the resource manager, the prepaid resource from the secured account to the user account according to the third request through the resource transfer server includes:

transferring, by the resource manager according to the received third request, the prepaid resource from the secured account to a settlement account preset in the resource manager;

sending, by the order server, a fourth request to the resource manager; and transferring, by the resource manager, the prepaid resource from the settlement account to the user account corresponding to the first client in the preprocessed order according to the fourth request.

This embodiment is an apparatus embodiment corresponding to the order processing method embodiment shown in FIG. 7 and FIG. 8. For the modules and implementations, refer to an implementation of corresponding steps in the embodiment corresponding to FIG. 7 and FIG. 8. Details are not described herein again.

The second client disclosed in this embodiment of the present disclosure generates an order preprocessing request according to a trigger operation of triggering a reference key on the second client, and sends the order preprocessing request to the order server, so that the order server completes order prepayment through the resource manager and the resource transfer server; and then the order server further completes settlement or resource returning through the resource manager and the resource transfer server according to an order settlement operation or an order cancellation operation inputted on the second client, thereby resolving a resource security problem in the related art. According to the second client disclosed in this embodiment of the present disclosure, a resource involved in an order is transferred from a user account to a secured account managed by a resource manager for temporary storage. When the order ends or is canceled, the resource is then transferred from the secured account to a settlement account, and order resource settlement is performed based on the settlement account, thereby effectively avoiding a problem of resource security that may occur when a resource is returned after a resource involved in a preprocessed order is transferred to a merchant account corresponding to a second client without a payment license.

During order preprocessing, the resource involved in the order is stored in the pre-registered secured account, and when settlement is performed, the resource is transferred to the settlement account to perform resource settlement, so that an order processing logic may be simplified and system stability may be improved. In addition, a transfer-in resource and a transfer-out are separately managed, thereby avoiding a resource loss of a user corresponding to the first client or the order server caused by insufficient user resources corresponding to the second client and improving order processing security.

Correspondingly, the present disclosure further discloses an electronic device, including a storage medium, a processor, and a machine-readable instruction stored in the storage medium and executable by the processor, where when executing the machine-readable instruction, the processor implements the order processing method shown in FIG. 3, FIG. 4, FIG. 7, and FIG. 8 of the present disclosure. The electronic device may be a personal computer (PC), a mobile terminal, a personal digital assistant, a tablet computer, or the like.

The present disclosure further discloses a non-transitory computer-readable storage medium, storing a computer program, where the program, when executed by a processor, implements steps of the order processing method according to the embodiments corresponding to FIG. 3, FIG. 4, FIG. 7, and FIG. 8 of the present disclosure.

The embodiments in this specification are all described in a progressive manner. Description of each of the embodiments focuses on differences from other embodiments, and reference may be made to each other for the same or similar parts among respective embodiments. A system embodiment is basically similar to a method embodiment. For related parts, refer to the parts in the method embodiment.

The order processing system and method provided in the present disclosure are described in detail above. The principle and implementations of the present disclosure are described herein by using examples. The descriptions of the foregoing embodiments are merely used for helping understand the method and core ideas of the present disclosure. In addition, a person skilled in the art can make variations to the present disclosure in terms of the implementations and application scopes according to the ideas of the present disclosure. Therefore, the content of this specification shall not be construed as a limit on the present disclosure.

Based on the foregoing descriptions of the embodiments, a person skilled in the art may clearly understand that each implementation may be implemented by software in addition to a necessary general hardware platform or by hardware. Based on such an understanding, the foregoing technical solutions essentially or the part contributing to the prior art may be implemented in a form of a software product. The software product is stored in a non-transitory computer readable storage medium, such as a ROM/RAM, a hard disk, or an optical disc, and includes several instructions for instructing a computer device (which may be a PC, a server, a network device, or the like) to perform the methods described in the embodiments or some parts of the embodiments.

What is claimed is:

1. An order processing system, comprising: a first client, a second client, an order server, a resource manager, and a resource transfer server, wherein either of the first client and the second client is configured to send an order preprocessing request to the order server according to an operation of a user;

the order server is configured to send a first request to the resource manager according to the received order preprocessing request and store a preprocessed order corresponding to the first request according to information that is fed back by the resource manager and that indicates that the first request is successfully processed;

the resource manager is configured to send a resource transfer request to the resource transfer server according to the first request, to transfer, through the resource transfer server, prepaid resources from a user account corresponding to the first client to a secured account preset in the resource manager;

the second client is further configured to send to the order server an order settlement request for the preprocessed order;

the order server is further configured to send a second request to the resource manager according to the received order settlement request, wherein the second request comprises a quantity of actually used resources; and the resource manager is further configured to transfer a remaining resource from the secured account to the user account according to the second request through the resource transfer server, wherein the remaining resource is obtained by subtracting the actually used resources from the prepaid resources.

2. The system according to claim 1, wherein the second client is further configured to send to the order server an order cancellation request for the preprocessed order when the user triggers a reference third key;

the order server is further configured to send a third request to the resource manager according to the received order cancellation request for the preprocessed order; and the resource manager is further configured to transfer the prepaid resources from the secured account to the user account according to the third request through the resource transfer server.

3. The system according to claim 2, wherein the resource manager transfers, according to the received third request, the prepaid resources from the secured account to a settlement account preset in the resource manager;

the order server sends a fourth request to the resource manager; and the resource manager transfers the prepaid resources from the settlement account to the user account corresponding to the first client according to the fourth request.

4. The system according to claim 1, wherein the resource manager transfers, according to the received second request, the remaining resource from the secured account to a settlement account preset in the resource manager;

the order server sends a fourth request to the resource manager; and the resource manager transfers the remaining resource from the settlement account to the user account corresponding to the first client according to the fourth request.

5. The system according to claim 1, wherein the order server is further configured to send a fifth request for the preprocessed order to the resource manager according to a reference time;

the resource manager is further configured to transfer, according to the fifth request, an actually used resource of the preprocessed order within the reference time from the secured account to a settlement account preset in the resource manager;

the order server is further configured to send a sixth request to the resource manager; and the resource manager is further configured to transfer the actually used resource within the reference time from the settlement account to a merchant account corresponding to the second client according to the sixth request.

6. The system according to claim 1, wherein the second client displays a first order preprocessing QR code in response to triggering of a reference first key; and the first client reads the first order preprocessing QR code displayed by the second client and sends the order preprocessing request to the order server; or the first client displays a second order preprocessing QR code as triggered by a user operation; and the second client reads, according to triggering of a reference second key, the second order preprocessing QR code displayed by the first client and sends the order preprocessing request to the order server.

7. The system according to claim 1, wherein information carried in the resource transfer request comprises an identifier of the order server and a user identifier of the user; and the resource transfer server performs payment verification according to the information carried in the resource transfer request, and returns information indicating the user account to the resource manager when the verification succeeds.

8. The order server, applied to the order processing system according to claim 1, wherein the order server comprises: a storage medium, a processor, and machine-readable instructions that are stored in the storage medium and are executable on the processor.

9. The order server according to claim 8, wherein the machine-readable instructions, when being executed by the processor, further implement the following method:

sending a third request to the resource manager according to a received order cancellation request for the preprocessed order, so that the resource manager transfers the prepaid resources from the secured account to the user account according to the third request through the resource transfer server.

10. The second client, applied to the order processing system according to claim 1, wherein the second client comprises a storage medium, a processor, and machine-readable instructions that are stored in the storage medium and are executable on the processor, and the machine-readable instructions, when being executed by the processor, implement the following method:

obtaining a trigger operation on a reference key;

scanning a second order preprocessing QR code displayed by the first client if the trigger operation is an order preprocessing operation;

generating the order preprocessing request according to a user identifier and a type identifier of the first client that are carried in the second order preprocessing QR code and a quantity of the prepaid resources;

sending the order preprocessing request to the order server.

11. An order processing method, applied to an order processing system, wherein the system comprises: a first client, a second client, an order server, a resource manager, and a resource transfer server, and the method comprises:

sending, by the order server, a first request to the resource manager according to a received order preprocessing request, so that the resource manager transfers, according to the first request through the resource transfer server, prepaid resources from a user account corresponding to the first client to a secured account preset in the resource manager;

storing, by the order server, a preprocessed order corresponding to the first request according to information that is fed back by the resource manager and that indicates that the first request is successfully processed; and sending, by the order server, a second request to the resource manager according to a received order settlement request for the preprocessed order, so that the resource manager transfers a remaining resource from the secured account to the user account according to the second request through the resource transfer server, wherein the second request comprises a quantity of actually used resources, and the remaining resource is obtained by subtracting the actually used resources from the prepaid resources.

12. The method according to claim 11, wherein after the step of storing the preprocessed order corresponding to the first request according to the information that is fed back by the resource manager and that indicates that the first request is successfully processed, the method further comprises:

sending, by the order server, a third request to the resource manager according to a received order cancellation request for the preprocessed order, so that the resource manager transfers the prepaid resources from the secured account to the user account according to the third request through the resource transfer server.

13. The method according to claim 11, wherein the transferring, by the resource manager, the remaining resource from the secured account to the user account according to the second request through the resource transfer server comprises:

transferring, by the resource manager according to the received second request, the remaining resource from the secured account to a settlement account preset in the resource manager;

sending, by the order server, a fourth request to the resource manager; and transferring, by the resource manager, the remaining resource from the settlement account to the user account corresponding to the first client according to the fourth request.

14. The method according to claim 12, wherein the transferring, by the resource manager, the prepaid resources from the secured account to the user account according to the third request through the resource transfer server comprises:

transferring, by the resource manager according to the received third request, the prepaid resources from the secured account to a settlement account preset in the resource manager;

sending, by the order server, a fourth request to the resource manager; and transferring, by the resource manager, the prepaid resources from the settlement account to the user account corresponding to the first client according to the fourth request.

15. The method according to claim 11, wherein after the step of storing the preprocessed order corresponding to the first request according to the information that is fed back by the resource manager and that indicates that the first request is successfully processed, the method further comprises:

sending, by the order server, a fifth request for the preprocessed order to the resource manager according to a reference time, so that the resource manager transfers, according to the fifth request, an actually used resource of the preprocessed order within the reference time from the secured account to a settlement account preset in the resource manager; and sending, by the order server, a sixth request to the resource manager, so that the resource manager transfers the actually used resource from the settlement account to a merchant account corresponding to the second client according to the sixth request.

16. The method according to claim 11, wherein the step of sending the first request to the resource manager according to the received order preprocessing request comprises:

sending, by the order server, the first request to the resource manager according to the order preprocessing request that is sent by the first client after the first client scans a first order preprocessing QR code displayed by the second client; or sending, by the order server, the first request to the resource manager according to the order preprocessing request that is sent by the second client after the second client scans a second order preprocessing QR code displayed by the first client.

17. An electronic device, comprising a storage medium, a processor, and a machine-readable instruction stored in the storage medium and executable by the processor, wherein when executing the machine-readable instruction, the processor implements the order processing method according to claim 11.

18. A non-transitory computer-readable storage medium, storing a computer program, wherein the program, when executed by a processor, implements steps of the order processing method according to claim 11.

19. An order processing method, applied to an order processing system, wherein the system comprises: a first client, a second client, an order server, a resource manager, and a resource transfer server, and the method comprises:

obtaining, by the second client, a trigger operation on a reference key;

scanning, by the second client, a second order preprocessing QR code displayed by the first client if the trigger operation is an order preprocessing operation;

generating, by the second client, an order preprocessing request according to a user identifier and a type identifier of the first client that are carried in the second order preprocessing QR code and a quantity of prepaid resources;

sending, by the second client, the order preprocessing request to the order server, so that the order server performs the following operations according to the order preprocessing request:

sending a first request to the resource manager, so that the resource manager transfers, according to the first request through the resource transfer server, the prepaid resources from a user account corresponding to the first client to a secured account preset in the resource manager; and storing a preprocessed order corresponding to the first request according to information that is fed back by the resource manager and that indicates that the first request is successfully processed; and receiving, by the second client, order preprocessing success information outputted by the order server, and storing the preprocessed order according to the order preprocessing success information.

* * * * *